Patented July 14, 1936

2,047,534

UNITED STATES PATENT OFFICE 2,047,534

ACETIC ACID MANUFACTURE

Walter O. Walker, Coral Gables, Fla., and Ulrich Kopsch, Leverkusen-on-the-Rhine, Germany, assignors to A. O. Smith Corporation, Milwaukee, Wis., a corporation of New York No Drawing. Application April 19, 1935, Serial No. 17,332

13 Claims. (Cl. 260—116)

The invention relates to the manufacture of acetic acid by the oxidation of acetaldehyde, and more particularly to a process of catalytically manufacturing acetic acid from dilute gaseous mixtures of acetaldehyde and other sources of acetaldehyde which are comprised only in part of acetaldehyde.

The production of acetic acid in an efficient and practical manner catalytically from acetaldehyde is of great importance technically and commercially, because of the great number of materials manufactured therefrom, among which may be mentioned acetic anhydride, cellulose acetate, acetone and numerous other products. At the present time, acetic acid is generally obtained from the distillation of wood, oxidation of ethyl alcohol and in a few other ways.

We have developed a new process for converting into acetic acid, the acetaldehyde content of materials comprised only in part of acetaldehyde. We have also developed a cobalt catalyst, particularly suitable for the oxidation of acetaldehyde to acetic acid.

One of the objects of the invention is to provide a cobalt catalyst for the production of acetic acid from acetaldehyde of substantially any concentration. A still further object is to provide a method of preparing and activating the cobalt catalyst in conjunction with acetic acid preparation.

Another object of the invention is to provide a method for the manufacture of acetic acid from dilute mixtures of acetaldehyde by oxidation of the acetaldehyde with oxygen, air, or other oxidizing fluids. A still further object is to provide a continuous process for catalytically manfacturing acetic acid from sources of acetaldehyde containing various other constituents with various catalysts.

Another object is to provide a process wherein the acetic acid formed may be removed at temperatures materially below the boiling point of acetic acid. Another object is to provide a method of bringing the acetaldehyde and oxidizing medium into intimate contact. Other objects will appear hereinafter.

The catalyst which is preferably used in accordance with our invention and which is also used and described in our parent U. S. application, filed May 7, 1932, now U. S. Patent No. 1,976,756, granted October 16, 1934, comprises a solution of cobaltic acetate in acetic acid. The catalyst solution may be made by dissolving cobaltous acetate in acetic acid and activating it by heating the solution to about 50° to 70° C. and passing a mixture of acetaldehyde and air, oxygen or other oxidizing fluid through the solution until the color of the solution changes to dark greenish brown or black. This solution is composed of or contains cobaltic acetate in acetic acid and it is hereinafter referred to in the specification and claims as the catalyst solution. The catalyst solution usually contains some water, say about 6%, but this content may vary from about 1% to 20%.

In place of cobaltous acetate, other salts such as cobalt carbonate, cobalt oxide and the like may be employed. Also, in the activation step, we prefer to use a substantial excess of air or other oxidizing medium. For example, when employing air, the gas mixture may contain a quantity of air five to eight times the quantity of acetaldehyde and even larger amounts are satisfactory. The quantity of oxidizing medium employed, with respect to the acetaldehyde in the activation of the catalyst solution may be larger than the quantity employed when acid formation is being carried out.

It is to be noted that our cobaltic acetate oxidation catalyst, its composition and its method of activation and subsequent use for acetic acid production are considered novel and important features of the present invention. Our cobaltic acetate oxidation catalyst when prepared in the proper manner and employed in the correct concentration is believed to be the best oxidation available for the production of acetic acid by the oxidation of acetaldehyde. While our cobalt catalyst is considered a substantial advance over the art, and while we prefer to employ this catalyst in all instances, certain of the features of our acetic acid process may be practiced to some degree of utility by the use of other oxidation catalysts to be described in detail hereinafter. Hence it is to be understood in the appended claims we do not wish to be limited to a cobaltic acetate catalyst, excepting wherein the claims specifically include this feature.

In making acetic acid in accordance with the invention, dilute acetaldehyde and oxygen, air, or other oxygen-containing gases, are dispersed in intimate contact with the catalyst solution. The oxidation of acetaldehyde to acetic acid is preferably carried out in the solution at about 50–80° C. but even somewhat higher or lower temperatures will operate. The dilute acetaldehyde may be introduced into the catalyst solution in the liquid state, but it is preferable to mix the diluted or lean acetaldehyde vapor with the oxidizing medium and introduce the mixture into the catalyst solution. While this feature of premixing the dilute acetaldehyde and oxidizing medium is important for intimate contact, there are various other ways of introducing the diluted acetaldehyde and oxidizing medium which are satisfactory. For example, the acetaldehyde and oxidizing medium can be introduced through separate conduits, which converge or meet in the vicinity of the catalyst solution, thereby permitting intimate contact of the aldehyde and oxidizing medium in their passage through the catalyst solution.

It being desirable to provide as extensive contact as possible between the catalyst and the gas, a convenient method consists of dispersing the gas mixture as small bubbles through the catalyst solution, for example by passing the gas into the lower level of the solution through extremely small pores, such as a porous alundum plate. However, other methods of obtaining intimate contact of catalyst and reacting gases, such as spraying the catalyst into the gas may be used.

The velocity of the reaction is sufficiently rapid to permit the use of relatively short contact periods, say about 6 to 18 seconds, but longer contact periods are not harmful, since the acetic acid and other products of the process are not vigorously acted on by the catalyst solution. Shorter periods may be used, but materially shorter periods give lower conversion of acetaldehyde to acetic acid.

One of the most important advantages of our method for the production of acetic acid is that it permits gases which merely contain acetaldehyde to be used directly for the production of acetic acid without requiring a preliminary separation of the acetaldehyde from the other constituents of the gas mixture. Prior to our invention, it was generally considered desirable, if not necessary, in processes of producing acetic acid, by the catalytic oxidation of acetaldehyde to employ concentrated acetaldehyde, namely, sources of acetaldehyde comprising 85–90% or more of acetaldehyde. To obtain such acetaldehyde may require the trouble and expense of concentration, redistillation and other treatment.

We have found that not only is the use of concentrated acetaldehyde unnecessary, but that diluted acetaldehyde, which is more readily obtainable and less costly, will give satisfactory results and when employed in certain ranges of dilution will give desirable results to be described hereinafter, not obtainable with concentrated acetaldehyde.

With some of the present known methods for the production of acetaldehyde it is obtained as one constituent of a gas mixture which contains other gases, such as hydrogen, nitrogen, carbon monoxide, carbon dioxide and hydrocarbon gases. According to the method of this invention, such acetaldehyde-containing gas mixtures are mixed with the appropriate quantity of oxygen, air, or other oxygen-containing gas and passed into a catalyst solution in which the acetaldehyde is oxidized to acetic acid, while the other constituents of the gas mixture pass through. Or, as previously indicated, the dilute acetaldehyde and oxidizing medium may be supplied separately to the catalyst solution.

Excellent results have been obtained with gas mixtures which contained as little as 2% acetaldehyde. With the lean mixtures, it is generally desirable to employ a larger excess of oxygen than with the mixtures which contain a larger percentage of acetaldehyde. The lean gas mixture could be prepared by diluting concentrated acetaldehyde and oxygen, or concentrated acetaldehyde and air, but it is not necessary to obtain concentrated acetaldehyde and dilute it for oxidation, since this method for the production of acetic acid satisfactorily effects the oxidation of commercially obtainable lean mixtures of acetaldehyde.

The following examples are illustrative of the manner and method of practicing the invention, and of the results which have been obtained by the use of lean or diluted gaseous mixtures containing acetaldehyde.

I. A good grade of substantially concentrated acetaldehyde was mixed with air. The gas mixture resulting, composed of 26.5% acetaldehyde by volume and the remainder air, was continuously bubbled through a porous alundum partition into a catalyst solution containing approximately 2% cobaltic acetate in acetic acid. The catalyst was heated to 65° C. It was found that about 91% of the acetaldehyde was converted into acetic acid, about 0.5% was not attacked, and the remainder was decomposed mainly to carbon dioxide and water. The velocity of the reaction was relatively rapid, about 6–18 seconds contact of gas and catalyst being amply sufficient.

II. A gas mixture composed of 4.6% acetaldehyde, 2.9% oxygen and 92.5% hydrogen by volume was bubbled through an alundum partition into a catalyst solution of 2% cobaltic acetate in glacial acetic acid, which was heated to about 56° C. This gas mixture contained an excess of about 30% oxygen over the theoretical requirement of oxygen for the oxidation of all the acetaldehyde to acetic acid. The vapor space over and the upper portion of the catalyst solution were heated to about 40° C. and the condensable vapors were condensed in a condenser. About 93% of the acetaldehyde yielded acetic acid, about 1% was unchanged and about 6% was decomposed into non-condensable gases. The contact of gases and catalyst was about that which was described in Example I.

III. A gas mixture composed of 5.7% acetaldehyde by volume, 3.1% ethylene, 1.2% acetylene, 49% methane and 37% hydrogen was mixed with sufficient air to supply a 100% excess of oxygen over the theoretical amount necessary to combine with the acetaldehyde and produce acetic acid. The mixed gas was bubbled through an alundum partition into a 2% catalyst solution of cobaltic acetate in glacial acetic acid, which was heated to a reaction temperature of 65°–70° C. The vapor space over and the upper portion of the catalyst solution were maintained at about 43° C. About 90% of the acetaldehyde was converted to acetic acid, a fractional percentage was unconverted and the remainder was changed into a non-condensable gas.

The above Examples II and III show that when employing an inexpensive source of acetaldehyde containing only around 5% acetaldehyde, but diluted with other constituents, such as methane, ethylene, acetylene and hydrogen, the percentage conversion to acetic acid was as high or higher than when a substantially concentrated acetaldehyde was employed.

It will be further observed that, even though acetic acid has a boiling point of about 118° C., by virtue of the partial pressure effect of the constituents, such as ethylene, methane, acetylene, hydrogen and other diluent gases, on the partial pressure of the acetic acid, it is possible to remove the acetic acid formed at temperatures materially below 118° C., namely the boiling point of acetic acid. The particular temperature required will be dependent on the volume of diluent gases present, but in the examples described and in all instances where material volumes of ethylene, acetylene, methane and other olefines or hydrocarbons were present, the temperature required will be well below 80° C. This is important in that it is more practical and economical to operate an oxidation tower at these temperatures.

The acetic acid which is formed by the oxidation of the acetaldehyde in the catalyst solution may be allowed to accumulate in the catalyst solution for a time and then separated from the catalyst by distillation, extraction or other suitable procedure, or the acetic acid may be continuously removed from the catalyst solution at substantially the rate at which it is formed in accordance with the continuous method for the manufacture of acetic acid, which is described and claimed in our above named U. S. Patent No. 1,976,756 and which is generic to this application in certain respects; in other features, this application is similar to a continuation-in-part thereof. See also Patent No. 1,976,757, of October 16, 1934 to Walter O. Walker and Ulrich Kopsch, filed May 7, 1932, for a method of manufacturing cobaltic acetate, to which the instant application is related.

The oxidation of diluted acetaldehyde can be accomplished with variations in the content of water, cobaltic acetate and acetic acid in the catalyst solution. Cobaltous acetate and other substances may be present. The concentration of cobaltic acetate may range from a few tenths of 1% to saturated solutions. A satisfactory catalyst may be made by dissolving 2 grams of cobaltous acetate containing four molecules of water of crystallization in 100 cubic centimeters of substantially glacial acetic acid which contains about 1.0% water. The cobaltous acetate is then partially or wholly converted to cobaltic acetate during the activation of the catalyst solution as already described. Reference is made to this solution in the specification and claims as an approximately 2% catalyst solution.

The oxidation of acetaldehyde to acetic acid, in accordance with our invention may be carried out in any suitable acid-resisting vessel adapted to contain the catalyst solution and into which the dilute acetaldehyde may be introduced, or through which it may be bubbled. More specifically, this oxidation may be carried out in the apparatus described in our above named U. S. Patent No. 1,976,756. Or the oxidation may be carried out in a column of well known construction, provided with plates, which plates are provided with perforations or bubble caps, the catalyst solution being introduced at or near the top of the column and progressing down the column counter-current to the rising dilute acetaldehyde, which may be introduced at or near the bottom of the column.

While we prefer to employ our new cobaltic acetate catalyst in producing acetic acid from dilute acetaldehyde because of the very high conversion obtained, we believe we are the first to appreciate that dilute or lean acetaldehyde may be satisfactorily converted with various oxidation catalysts. Consequently, our invention embraces the catalytic conversion of lean acetaldehyde with other catalysts such as acetates of manganese, vanadium, cerium and nickel, for example, when applying the features described above.

In the specification and claims, where we refer to dilute or lean acetaldehyde or diluted gaseous mixtures of acetaldehyde, we refer to a source of acetaldehyde comprised only in part of acetaldehyde and containing material quantities of diluent constituents such as saturated and unsaturated hydrocarbons, hydrogen and the like.

We claim:

1. The method of making acetic acid from a hydrocarbon diluted gaseous mixture of acetaldehyde which comprises passing the dilute gaseous mixture of acetaldehyde into an acetic acid solution of a metal acetate catalyst, supplying oxygen by introducing air into the catalyst and oxidizing the acetaldehyde in the dilute mixture of acetaldehyde.

2. The process of manufacturing acetic acid from a hydrocarbon diluted acetaldehyde which comprises premixing the dilute acetaldehyde with air to form an acetaldehyde-air mixture and passing the mixture in contact with an acetic acid solution of a metal acetate maintained at a temperature between about 50° C. to about 80° C.

3. The method of producing acetic acid which comprises oxidizing with free oxygen hydrocarbon diluted acetaldehyde in the presence of a catalyst comprising essentially a solution in acetic acid containing around 6% of water, of from a few tenths of 1% of cobaltic acetate to an amount of cobaltic acetate which will give a saturated solution at room temperature.

4. The method of making acetic acid from a hydrocarbon diluted gaseous mixture of acetaldehyde which comprises passing the dilute gaseous mixture of acetaldehyde into an acetic acid solution of a metal acetate catalyst, supplying oxygen by introducing into the catalyst solution a gas which contains free oxygen, and oxidizing the acetaldehyde in the dilute mixture of acetaldehyde.

5. The method of producing acetic acid from sources of acetaldehyde comprised only in part of acetaldehyde which includes contacting a gaseous mixture containing from about 2% to 75% of acetaldehyde, the remainder of the mixture being principally non-oxidizable constituents, with an acetic acid solution of a metal acetate catalyst, supplying oxygen by introducing into the catalyst solution a gas which contains free oxygen, and oxidizing the acetaldehyde in the mixture.

6. The method of making acetic acid from lean acetaldehyde which comprises contacting a mixture containing from about 4% to about 30% of acetaldehyde, the remainder of the mixture containing saturated hydrocarbons, unsaturated hydrocarbons and hydrogen, with a catalyst comprising essentially an acetic acid solution of cobaltic acetate maintained at a temperature of between about 50° C. to about 80° C. and supplying free oxygen by introducing air into the catalyst solution.

7. The process of preparing acetic acid from a dilute gaseous mixture containing from 2% to less than 40% of acetaldehyde which comprises passing the dilute gaseous mixture of acetaldehyde into contact with an acetic acid solution of a metal acetate catalyst, maintaining the catalyst solution at a temperature between about 50° C. and about 70° C. and supplying free oxygen whereby acetic acid is formed and employing temperatures materially below 100° C. to recover acetic acid from the catalyst solution by vaporization.

8. The process of producing acetic acid which comprises forming a catalyst solution by dissolving a cobaltous salt in acetic acid, activating this solution by passing a mixture of acetaldehyde and air through the solution until the color of the solution changes to a greenish brown or black, thereafter passing a gaseous mixture comprised only in part of acetaldehyde in contact with the activated solution, supplying oxygen by introducing into the catalyst solution a gas which contains oxygen, and oxidizing the acetaldehyde in the gaseous mixture.

9. The method of manufacturing acetic acid which comprises forming a catalyst solution by dissolving a cobaltous salt in acetic acid, activating this solution by contacting a mixture of acetaldehyde and a considerable excess of air therewith until at least a part of the cobaltous salt is converted to the cobaltic state, thereafter passing a dilute gaseous mixture of acetaldehyde in contact with the activated catalyst solution, supplying oxygen by introducing a quantity of air less than a considerable excess into the catalyst solution, and oxidizing the acetaldehyde in the dilute gaseous mixture of acetaldehyde.

10. A catalyst for the production of acetic acid which comprises essentially a substantially glacial acetic acid solution of cobaltic acetate and which has been activated by aldehyde and free oxygen.

11. A catalyst solution for the production of acetic acid which comprises essentially a solution of acetic acid containing from about 1% to 10% of water, of from a few tenths of 1% of cobaltic acetate to an amount of cobaltic acetate which will give a saturated solution at room temperature and which has been activated with aldehyde and a considerable excess of air.

12. A method for manufacturing acetic acid which comprises forming a catalyst solution by dissolving a cobaltous salt in acetic acid, activating this solution by contacting a mixture of acetaldehyde and a considerable excess of air therewith until at least a part of the cobaltous salt is converted to the cobaltic state, thereafter passing acetaldehyde in contact with the activated catalyst solution, supplying oxygen by introducing a quantity of air less than a considerable excess into the catalyst solution, and oxidizing the acetaldehyde to acetic acid.

13. A catalyst solution for producing acetic acid from dilute acetaldehyde comprising an acetic acid solution of cobaltic acetate which contains above .04% normality of cobaltic ion and which has been subjected to an activation treatment with acetaldehyde and a considerable excess of air.

ULRICH KOPSCH.
WALTER O. WALKER.